US010576366B2

(12) United States Patent
Mizuki et al.

(10) Patent No.: US 10,576,366 B2
(45) Date of Patent: Mar. 3, 2020

(54) GAME SYSTEM, CONTROL METHOD, STORAGE MEDIUM, AND TERMINAL DEVICE

(71) Applicant: NINTENDO CO., LTD., Kyoto (JP)

(72) Inventors: Kiyoshi Mizuki, Kyoto (JP); Hideto Yuzawa, Kyoto (JP); Shunsaku Kato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 959 days.

(21) Appl. No.: 13/742,759

(22) Filed: Jan. 16, 2013

(65) Prior Publication Data

US 2013/0324258 A1 Dec. 5, 2013

(30) Foreign Application Priority Data

May 31, 2012 (JP) .................................. 2012-124672

(51) Int. Cl.
*A63F 13/30* (2014.01)
*A63F 13/35* (2014.01)
*A63F 13/795* (2014.01)
*A63F 13/5375* (2014.01)
*A63F 13/5372* (2014.01)

(52) U.S. Cl.
CPC .............. *A63F 13/12* (2013.01); *A63F 13/35* (2014.09); *A63F 13/5372* (2014.09); *A63F 13/5375* (2014.09); *A63F 13/795* (2014.09)

(58) Field of Classification Search
CPC ............ A63F 2300/305; A63F 13/5372; A63F 13/5375
USPC .......................................................... 463/42
See application file for complete search history.

(56) References Cited

U.S. PATENT DOCUMENTS

| | | | |
|---|---|---|---|
| 6,241,524 B1 * | 6/2001 | Aoshima et al. | 434/118 |
| 6,582,230 B1 * | 6/2003 | Aoshima et al. | 434/118 |
| 7,386,799 B1 * | 6/2008 | Clanton et al. | 715/758 |
| 8,042,045 B1 * | 10/2011 | Sullivan et al. | 715/708 |
| 8,628,423 B2 * | 1/2014 | Chung et al. | 463/42 |
| 2002/0068626 A1 * | 6/2002 | Takeda et al. | 463/30 |
| 2005/0246638 A1 * | 11/2005 | Whitten | 715/708 |
| 2007/0115256 A1 * | 5/2007 | Lee et al. | 345/156 |
| 2007/0218997 A1 * | 9/2007 | Cho | A63F 13/12 463/42 |

(Continued)

OTHER PUBLICATIONS

YouTube user RXQ79, "Planescape Torment—gameplay", posted on Sep. 25, 2011, Youtube.com, retrieved from URL:«https://www.youtube.com/watch?v=wJD2rCDFjz8».*

(Continued)

*Primary Examiner* — Ronald Laneau
(74) *Attorney, Agent, or Firm* — Nixon & Vanderhye PC

(57) ABSTRACT

An exemplary game system including a plurality of terminal devices and a predetermined server, the plurality of terminal devices being respectively used by a user, the game system includes: a display control unit configured to performs processing for drawing a virtual space image which is an image representing a virtual space, and processing for compositing at least the posted information input by another user that is stored in the posted information storage unit, in the virtual space image in association with the virtual game character that is indicated by the identification information associated with the posted information, and presenting the composite image to the user in each terminal device.

11 Claims, 6 Drawing Sheets

(56) References Cited

U.S. PATENT DOCUMENTS

| | | | |
|---|---|---|---|
| 2008/0016446 A1* | 1/2008 | Aonuma et al. | 715/733 |
| 2009/0118015 A1* | 5/2009 | Chang et al. | 463/42 |
| 2009/0158154 A1* | 6/2009 | Kim | 715/716 |
| 2009/0209337 A1* | 8/2009 | Vrignaud et al. | 463/31 |
| 2009/0227368 A1* | 9/2009 | Wyatt | 463/31 |
| 2010/0041475 A1* | 2/2010 | Zalewski et al. | 463/30 |
| 2011/0111854 A1* | 5/2011 | Roberts et al. | 463/39 |
| 2011/0112665 A1* | 5/2011 | Roberts et al. | 700/94 |
| 2011/0173587 A1* | 7/2011 | Detwiller | A63F 13/10 717/109 |
| 2011/0238762 A1* | 9/2011 | Soni et al. | 709/206 |
| 2011/0281648 A1* | 11/2011 | Weising | 463/32 |
| 2013/0005471 A1* | 1/2013 | Chung et al. | 463/42 |
| 2013/0024544 A1* | 1/2013 | Oshita | 709/217 |
| 2013/0029767 A1* | 1/2013 | Boutin | 463/42 |
| 2013/0086077 A1* | 4/2013 | Piippo et al. | 707/748 |
| 2013/0116022 A1* | 5/2013 | Davison et al. | 463/9 |

OTHER PUBLICATIONS

"How Does Online Game Rental Work? Gamefly Review 2014", published Jun. 20, 2014, Youtube.com, retrieved from «URL:https://www.youtube.com/watch?v=RUIdULFzros».*

Xbox Live, Listen Watch Control Play, xbox.com, Jan. 9, 2013, 2 pages.

Xbox Live, Japanese language, Jan. 9, 2013, 1 page.

* cited by examiner

GAME SYSTEM, CONTROL METHOD, STORAGE MEDIUM, AND TERMINAL DEVICE

CROSS REFERENCE TO RELATED APPLICATIONS

This application is based on and claims priorities under 35 USC 119 from Japanese patent applications No. 2012-124672, which was filed on May 31, 2012.

FIELD

The technology herein relates to sharing posted information.

BACKGROUND AND SUMMARY

Information-processing devices that are able to communicate with other users using a communication function are known.

The technology herein provides technology for using posted information in applications other than client applications of a posted information sharing system.

There is provided a game system including plural terminal devices and a predetermined server, the plural terminal devices being respectively used by a user, the game system including: a game processing unit configured to perform interaction processing with a virtual game character that exists in a predetermined virtual game space, based on an instruction input from the user of each terminal device; a posted information generating unit configured to generate posted information, based on an input of the user of each terminal device; a posted information storage unit configured to store the posted information generated using the input of each user by the posted information generating unit, in the server in association with identification information of the virtual game character; and a display control unit configured to performs processing for drawing a virtual space image which is an image representing a virtual space, and processing for compositing at least the posted information input by another user that is stored in the posted information storage unit, in the virtual space image in association with the virtual game character that is indicated by the identification information associated with the posted information, and presenting the composite image to the user in each terminal device.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENTS

1. Configuration

Figure 1:
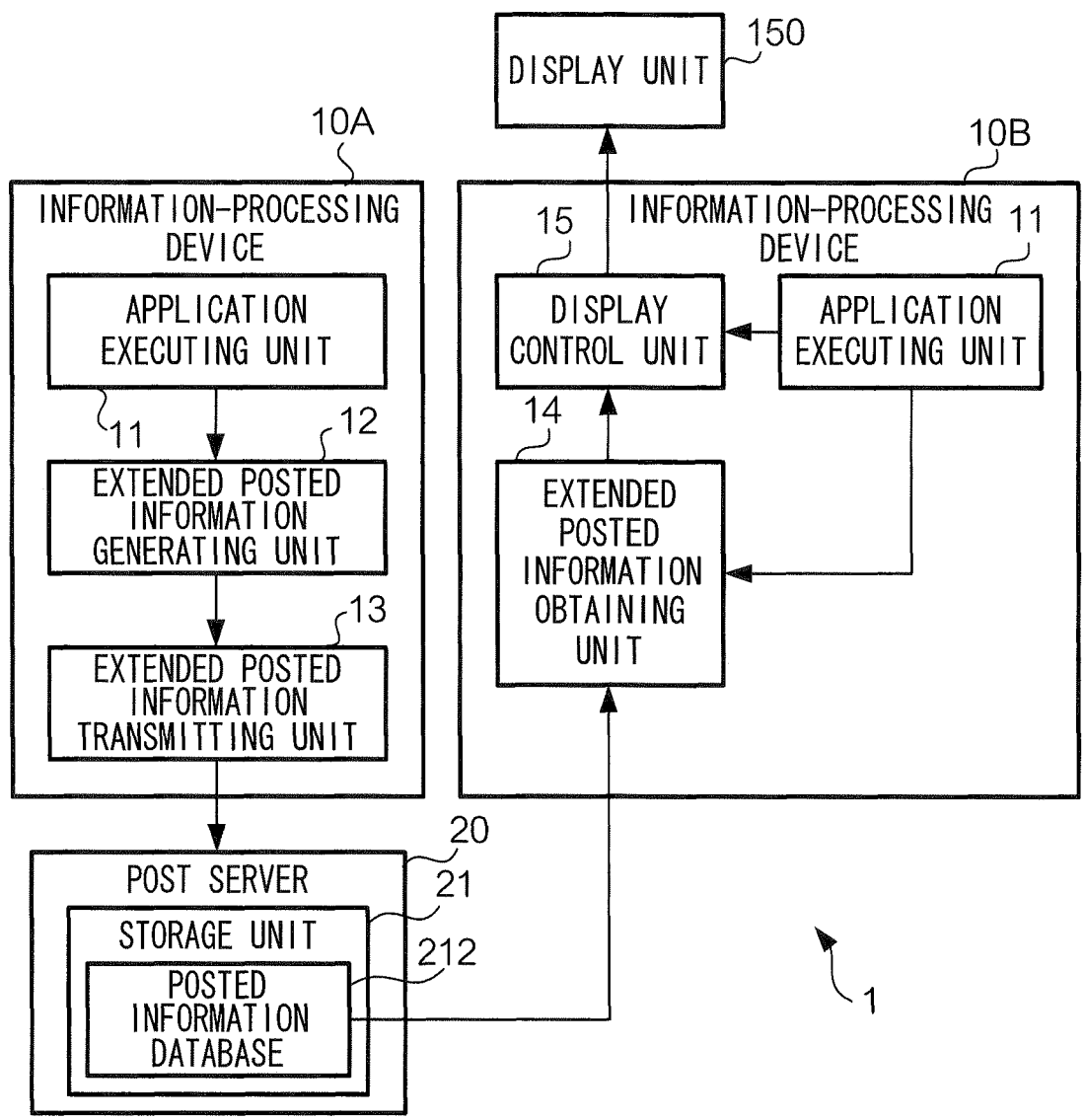
FIG. 1 shows an example of a functional configuration of posted information sharing system 1.

FIG. 1 shows an example of a functional configuration of posted information sharing system 1 according to one embodiment. Posted information sharing system 1 (an example of game system) includes plural information-processing devices 10 (an example of terminal devices) and post server 20. Post server 20 is a server device for providing a posted information sharing system (posted information sharing service). In the posted information sharing system, posted information from each of the plural information-processing devices 10 is transmitted to post server 20. Post server 20 includes storage unit 21 that stores posted information database 212 for accumulating posted information. Post server 20, according to a request from a specific information-processing device 10, provides posted information accumulated in posted information database 212 to information-processing device 10 from which the request originated. Posted information includes character strings (text), handwritten characters or images that serve as posts (comments, messages, etc.) input by users. That is, the users of information-processing devices 10 are able to view the comments of other users, share their own comments and the like and exchange messages with other users, through this information sharing service.

In the present embodiment, a given information-processing device 10 transmits additional data generated by an application program to post server 20, in addition to posted information. In the present embodiment, additional data includes character identification information which is information specifying a virtual game character (hereinafter, virtual character) that appears in virtual space, and stage identification information indicating a game stage (hereinafter, stage). Post server 20 accumulates (stores) transmitted posted information in association with transmitted additional data in posted information database 212 as "posted information with additional data". Hereinafter, this "posted information with additional data" will be called "extended posted information", meaning posted information that has been extended. Another information-processing device 10 downloads the extended posted information from post server 20. Hereinafter, when distinguishing between information-processing device 10 that transmitted extended posted information and information-processing device 10 that downloaded extended posted information, the former will be called information-processing device 10A, and the latter will be called information-processing device 10B. In information-processing device 10B, when extended posted information that has been downloaded is used in an application program, the posted information is displayed in association with a virtual character that is indicated by character identification information included in the extended posted information. For example, a display position of the posted information is determined based on the display position of the virtual character (e.g., display position of posted information is determined in the vicinity of the display position of the virtual character), and the posted information is displayed. In the case of the virtual character being a character that moves through virtual space, the display position of posted information changes according to the movement of the virtual character. Predetermined graphics such as graphics that associate an image of the virtual character and an image of the posted information may be displayed without displaying the posted information in the vicinity thereof.

Also, in the present embodiment, a game application executed in information-processing device 10B includes plural stages. In this game application, a menu image for prompting a player to select a stage (hereinafter, stage selection screen) is displayed before the start of a game. Icons for selecting each stage (hereinafter, stage icons) are displayed on this menu image, and stage selection is performed by the player selecting those icons. Information-processing device 10B displays the each item of posted information on the stage selection screen in association with each stage icon. More specifically, information-processing device 10B, using stage identification information included in additional data, displays posted information in association with an icon of the stage indicated by the stage identification information. Note that in the present embodiment, an application program is a program that can be executed independently by information-processing device 10, that is, a program that can be executed stand-alone. In other words, execution is possible without communicating with a server or another information-processing device 10. However, an application program may also be executed while communicating with a server or another information-processing device 10. Hereinafter, functions will be described for each of information-processing device 10A and information-processing device 10B.

Information-processing device 10A includes application executing unit 11, extended posted information generating unit 12, and extended posted information transmitting unit 13. Application executing unit 11 executes an application program (e.g., game program). This game program controls operation of virtual characters in virtual space through user operations and computer controls, and includes a set of codes for executing processing for drawing and displaying images that are captured of virtual space with a virtual camera. Extended posted information generating unit 12 generates posted information such as comments and the like input by a user and the aforementioned additional data. Extended posted information transmitting unit 13 transmits extended posted information generated by extended posted information generating unit 12 to post server 20.

Game processing unit 16, stage data storage unit 17 and stage selecting unit 18 are realized, though application executing unit 11 executing the set of codes included in the game program. Game processing unit 16 performs interaction processing with virtual game characters that exist in a predetermined virtual game space, based on an instruction input by the users of information-processing devices 10. Also, game processing unit 16 includes a movement control unit that controls the movement of virtual game characters. Stage data storage unit 17 stores plural items of stage data. Stage selecting unit 18 selects a stage to be played from the plural items of stage data. Game processing unit 16, further, executes predetermined game processing (including aforementioned interaction processing) in the stage selected by the stage selecting unit 18, based on an instruction input by the user of the terminal device.

In this example, stage selecting unit 18 includes an icon image storage unit, an icon image display unit, and a posted information display control unit (all not shown in the figures). The icon image storage unit stores icon images showing each item of stage data. The icon image display unit selectably displays the icon images. The posted information display control unit displays at least posted information of another user that is stored in storage unit 21, in association with the icon image of the stage indicated by the stage identification information of that posted information.

Information-processing device 10B includes application executing unit 11, extended posted information obtaining unit 14, and display control unit 15. Extended posted information obtaining unit 14 obtains extended posted information from post server 20. Display control unit 15 performs processing for drawing a virtual space image which is an image representing a virtual space. Furthermore, display control unit 15 composites at least posted information input by another user that is stored in storage unit 21, in this virtual space image in association with a virtual game character indicated by identification information associated with that posted information. Display control unit 15 presents the composite image to the user.

Note that in the case of an application program that is executed stand-alone, game processing unit 16 of information-processing device 10A performs interaction processing based on an instruction input from the user of information-processing device 10A (hereinafter, "user A"), and game processing unit 16 of information-processing device 10B performs interaction processing based on an instruction input from the user of information-processing device 10B (hereinafter "user B"). At this time, game processing unit 16 of information-processing device 10A does not perform interaction processing based on an instruction input by user B of information-processing device 10B, and game processing unit 16 of information-processing device 10B does not perform interaction processing based on an instruction input by user A of information-processing device 10A.

Figure 2:
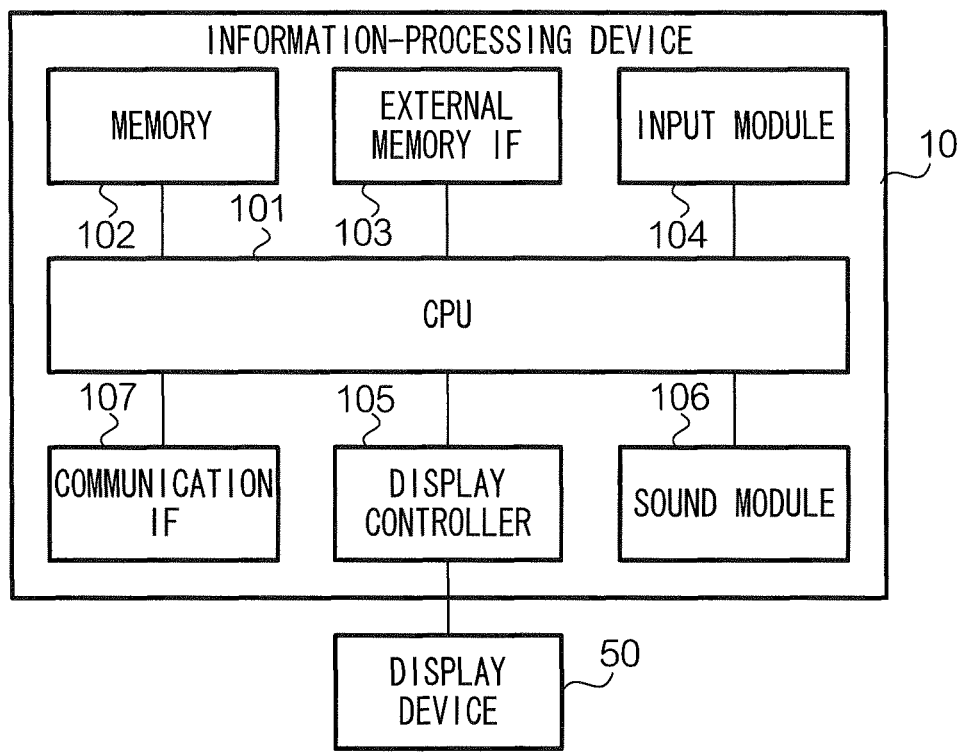
FIG. 2 shows an example of a hardware configuration of information-processing device 10.

FIG. 2 shows an example of a hardware configuration of information-processing device 10. In this example, information-processing device 10 is a game device for executing a video game. Information-processing device 10 is a computer device including CPU (Central Processing Unit) 101, memory 102, external memory IF 103, input module 104, display controller 105, sound module 106, and communication IF 107. Information-processing device 10 is connected to display device 50. Display device 50 is a device that displays information such as images and characters, and includes a display (liquid crystal panel, organic Electro-Luminescence (EL) panel, etc.) and a driver circuit. In this example, information-processing device 10 is a so-called console-type game device, and does not include display device 50. Display device 50 is an external device, such as a television receiver, for example. Note that information-processing device 10 may include display device 50.

CPU 101 is a device that controls the constituent elements of information-processing device 10, and performs various arithmetic operations. Memory 102 is a storage device that stores programs and data, and includes a RAM (Random Access Memory) and a ROM (Read Only Memory), for example. External memory IF 103 is an interface that performs writing and reading of programs and data to and from an external storage medium (e.g., optical disk, magnetic disk or semiconductor memory) that stores programs and data. Input module 104 is an input device that inputs instructions or commands from the user to CPU 101, and includes a keypad, buttons, a touch screen or a microphone, for example. Display controller 105 is a device that causes the display device to display information such as images and characters, and includes an image processing circuit and a video signal output circuit, for example. Sound module 106 is a device that outputs an audio signal, and includes an audio processing circuit and an audio signal output circuit, for example. Communication IF 107 is a device that performs communication via a wired or wireless network (e.g., the Internet) in accordance with a predetermined communication standard.

Figure 3:
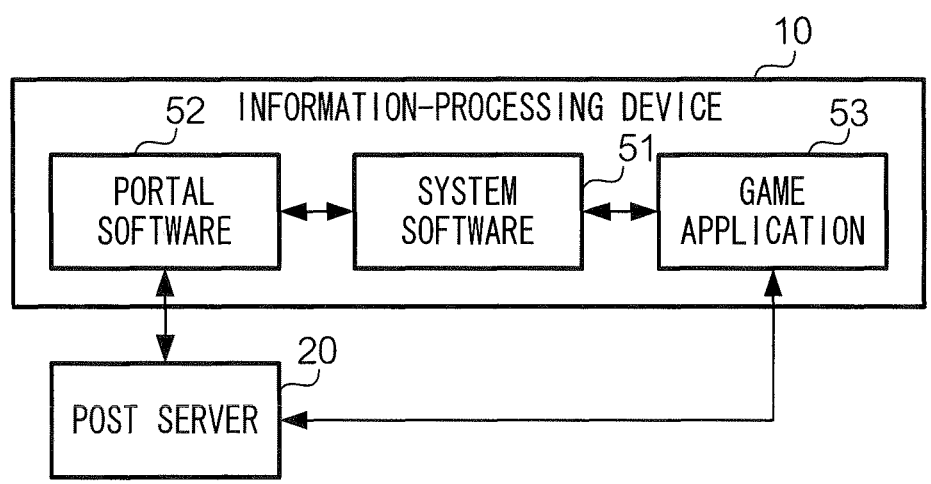
FIG. 3 shows an example of a software configuration of information-processing device 10.

FIG. 3 shows an example of a software configuration of information-processing device 10. Information-processing device 10 includes system software 51, portal software 52, and game application 53.

System software 51 is software for managing or controlling information-processing device 10. System software 51 is essential software for executing various application programs in information-processing device 10, and is software that definitely exists in information-processing device 10 when an application program is executed. In this example, system software 51 includes OS (Operating System) 511. OS 511 is basic software for operating application programs such as portal software 52 and game application 53.

Portal software 52 is client software of the posted information sharing system, and provides an interface for presenting information to the user and receives input of information from the user. Portal software 52 transmits a request to post server 20, and controls the display device to display an image of the information sharing system, in accordance with data that is transmitted from post server 20 according to the request. The image of the information sharing system includes one or more items of posted information of one or more users and a UI (User Interface) for inputting and transmitting posted information.

Note that in the case where plural users share information-processing device 10, the user who is active is specified by so-called login processing.

Game application 53 is an application program (software) for causing information-processing device 10 to execute a video game. Information-processing device 10 is capable of executing various game applications 53. Programs for realizing game applications 53 are stored in a storage medium (external memory), for example, and the user executes a desired game application 53 on information-processing device 10, by causing information-processing device 10 to read the program stored in a desired storage medium from among plural storage media that respectively store different programs. In another example, plural programs are stored in memory 102, and the user executes a desired game application 53 on information-processing device 10 by executing a desired program from among the stored programs.

In the present embodiment, system software 51 and portal software 52 are prestored in memory 102 in a non-volatile manner at the point of sale of the information-processing device. That is, system software 51 and portal software 52 are provided as functions of the platform of information-processing device 10. Game application 53 is stored in an external memory. Note that game application 53 may be stored in memory 102. Also, at least one of system software 51, portal software 52 and game application 53 may be provided by download via a network, rather than being prestored at the point of sale of the information-processing device, and may be updated to the latest version by network update.

CPU 101 is an example of application executing unit 11. CPU 101, when executing game application 53, is an example of extended posted information generating unit 12, extended posted information transmitting unit 12, extended posted information obtaining unit 14, and display control unit 15.

2. Operations

Next, operations of posted information sharing system 1 will be described. Here, posting of extended posted information in information-processing device 10A, downloading of extended posted information in information-processing device 10B, and use of extended posted information in information-processing device 10B will be described, and a more specific example of operations will be described at the end.

2-1. Posting of Extended Posted Information

Figure 4:
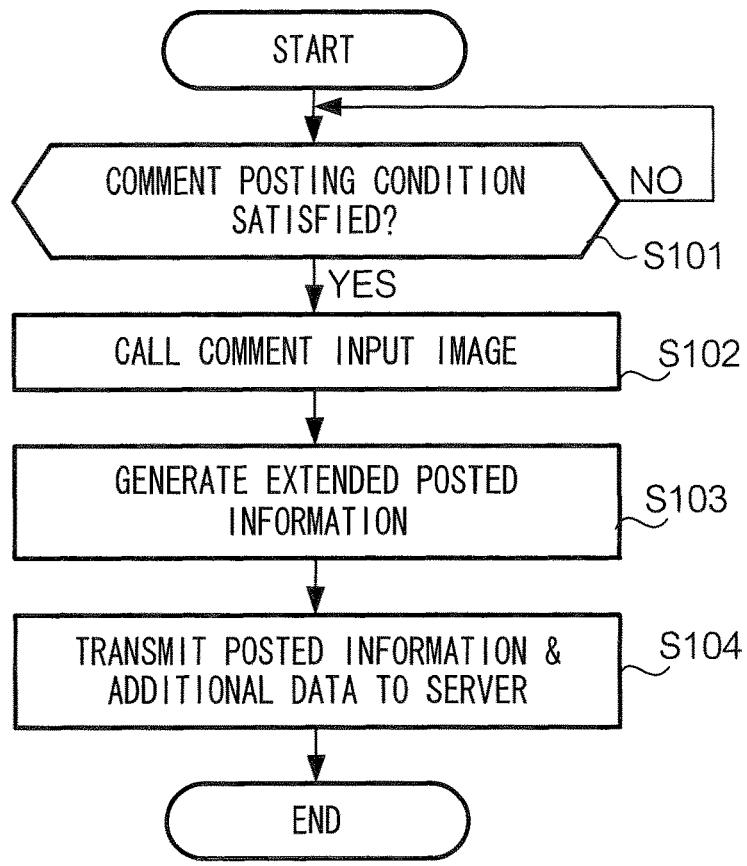
FIG. 4 shows an example of a flowchart illustrating processing for posting extended posted information.

FIG. 4 shows an example of a flowchart illustrating processing for posting extended posted information from game application 53. At the start of the flow in FIG. 4, game application 53 is being executed.

Game application 53 is executing predetermined interaction processing with a virtual character based on the operation of the user. In step S101, game application 53 determines whether predetermined interaction processing was performed or whether a result of the interaction processing was a predetermined result. Predetermined interaction processing is battle processing, conversational processing or the like with a virtual character. Specifically, it is determined, in step S101, whether a result such as having played against a virtual character and won/lost/talked/become friends or the like has been obtained. Furthermore, it is determined, in step S101, whether the stage was cleared. These conditions are exemplary conditions for posting a comment. Hereinafter, these conditions will be called "comment posting conditions". If it is determined that a comment posting condition has been satisfied (S101: YES), game application 53 shifts the processing to step S102. If it is determined that a comment posting condition has not been satisfied (S101: NO), game application 53 periodically determines whether a condition has been satisfied, while advancing the game in parallel.

In step S102, game application 53 calls a comment input image. The comment input image includes a text box for inputting comments, and a send button for instructing transmission of comments. When the user inputs a comment and presses the send button, game application 53 shifts the processing to step S103. A configuration may also be adopted in which a comment can be input by handwritten input with a touch screen or the like.

In step S103, game application 53 generates extended posted information. This extended posted information includes the comment created in step S102 and additional data. Additional data includes the aforementioned character identification information and stage identification information. For example, if it is determined in step S101 that the player has won in fight processing against character A, the identification information of character A is set as the character identification information of the additional data in step S103. Also, if the current stage (stage being played when a comment is input) is stage 3, the identification information of stage 3 is set as the stage identification information of the additional data. Note that when it is determined in step S101 that the stage has been cleared, stage 3 is set as the stage identification information, and null is set for the character identification information.

In step S104, game application 53 transmits posted information and the generated additional data to post server 20. The posted information includes the input comment and attribute information of the comment. Attribute information includes, for example, identification information (hereinafter "application ID") of game application 53 that generated the comment, a user ID indicating the user who posted the comment, and a timestamp indicating posting date and time.

Post server 20 receives the extended posted information, and registers the extended posted information that is received in posted information database 212.

2-2. Download of Extended Posted Information

Figure 5:
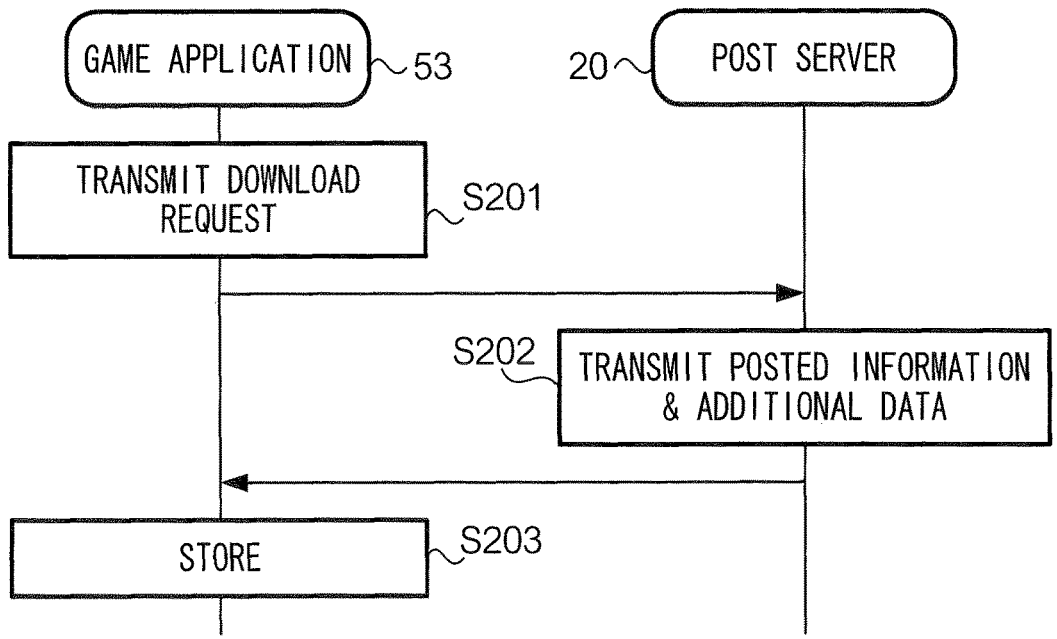
FIG. 5 shows an example of a sequence chart illustrating processing for downloading data.

FIG. 5 shows an example of a sequence chart illustrating processing for downloading data. This shows processing executed in information-processing device 10B. Here, an example will be described in which extended posted information uploaded to post server 20 is downloaded from game application 53.

In step S201, game application 53 transmits a download request for extended posted information to post server 20, when game application 53 is activated, for example. This download request includes the application ID of self (of the application that is being executed on information-processing device 10B).

When receiving the download request, post server 20 extracts extended posted information having, as attribute information, an application ID that matches the application ID included in the received download request, from the extended posted information registered in posting database 212. That is, when a download request for extended posted information is received from a given application program, post server 20 extracts extended posted information created by the same application program. At this time, post server 20 may extract all of the corresponding extended posted information, or may extract a portion of the extended posted information that is registered. In the latter case, a certain number of the latest items of corresponding extended posted information may be extracted, for example. Alternatively, in the case where stage identification information is included in the download request, extended posted information posted in the corresponding stage may be extracted.

Post server 20 transmits (in step S202) an extended posted information group, which is a set of extended posted information that has been extracted, to information-processing device 10 that transmitted the download request.

On receiving the extended posted information group, game application 53 stores (in step S203) the extended posted information group that is received in memory 102.

2-3. Use of Extended Posted Information

Figure 6:
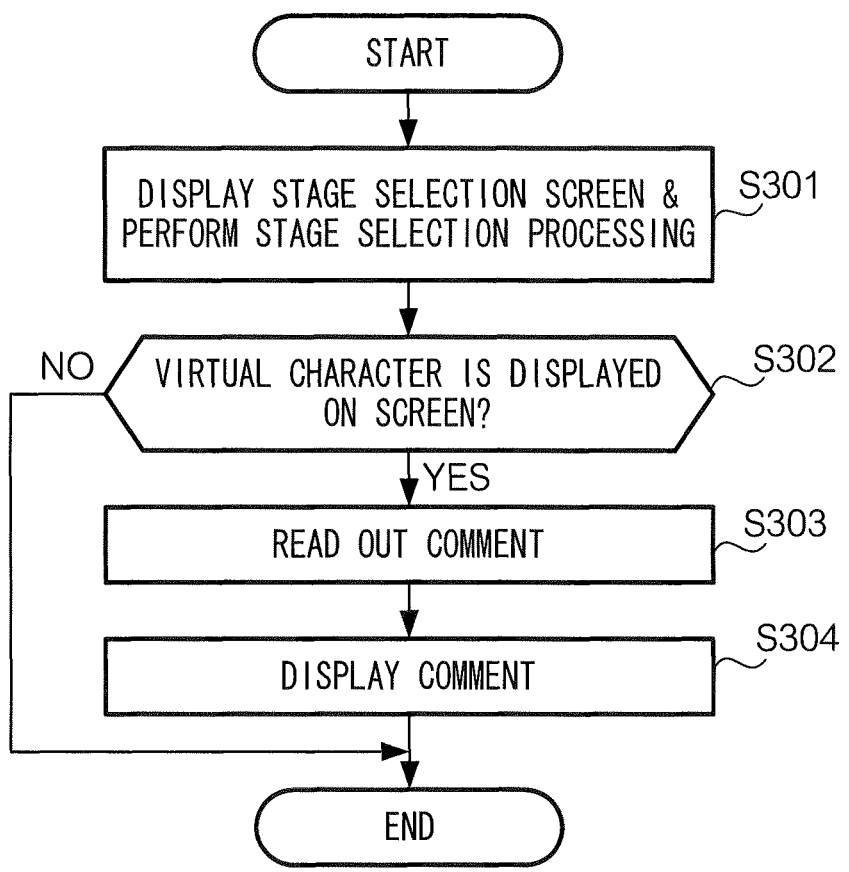
FIG. 6 shows an example of a flowchart showing processing using extended posted information.

FIG. 6 shows an example of a flowchart illustrating processing for using extended posted information in game application 53. This is processing executed in information-processing device 10B.

Figure 8:
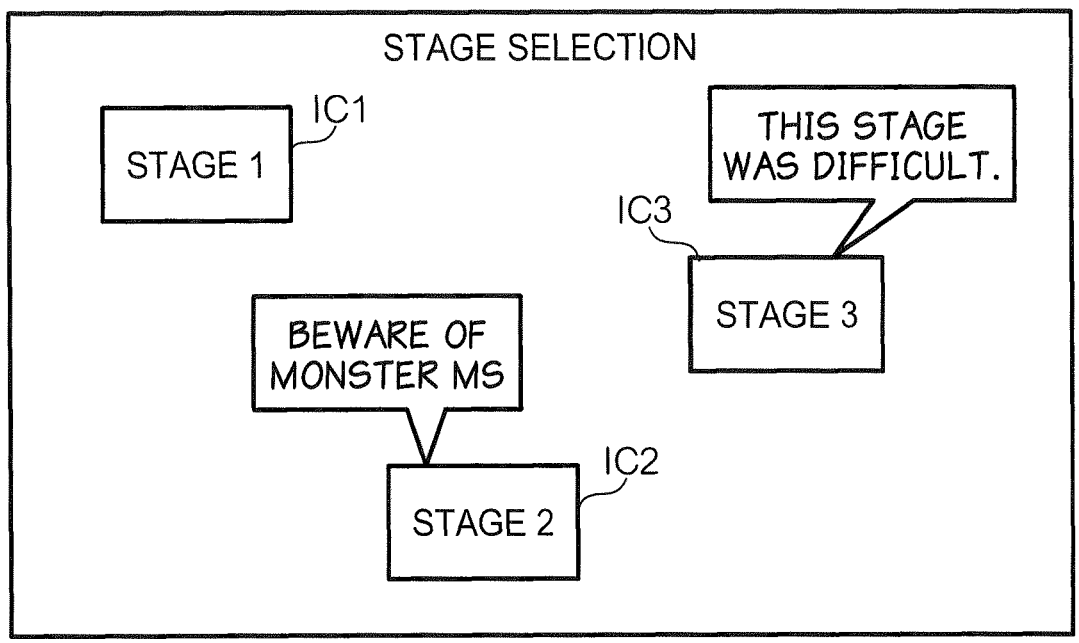
FIG. 8 shows an example of a stage selection image.

In step S301, game application 53 displays a stage selection image. More specifically, as shown in FIG. 8, icons indicating each stage (icon IC1 indicating stage 1, icon IC2 indicating stage 2, and so on) are displayed. At this time, game application 53 refers to the stage identification information of each item of extended posted information stored in memory 102, and displays each item of posted information in association with the icon of the stage indicated by the corresponding item of stage identification information. That is, out of the posted information stored in memory 102, posted information input while stage 1 is being played and posted information input when stage 1 has been cleared is displayed in association with icon IC1, and posted information input while stage 2 is being played and posted information input when stage 2 has been cleared is displayed in association with icon IC2. In FIG. 8, posted information "Beware of monster MS" is posted information input in stage 2, and stage 2 is set for the stage identification information. Also, posted information "This stage was difficult" is posted information input when stage 3 has been cleared, and the identification information of stage 3 is set. In step S302, it is determined which stage icon the player has selected, and the posted information of that stage is disclosed.

In step S302, it is determined whether any of the virtual characters in virtual space are displayed on the screen. If it is determined that a given virtual character is displayed on the screen (S302: YES), game application 53 shifts the processing to step S303. If it is determined that none of the virtual characters are displayed (S302: NO), game application 53 ends the processing in FIG. 6.

In step S303, game application 53 reads out, from memory 102, extended posted information to which the character identification information of the virtual character that was determined to be displayed on the screen in step S302 is added. The processing to be performed in the case where there are plural items of corresponding extended posted information is determined in advance. For example, game application 53 reads out a predetermined number of items of extended posted information (e.g., one) in order of newest to oldest from the plural items of extended posted information. Alternatively, game application 53 displays an image for prompting the user to select extended posted information, and reads out the at least one item of extended posted information selected by the user.

In step S304, game application 53 displays the posted information (comment) included in each item of extended posted information that is read out, in association with the virtual character indicated by the character identification information of the extended posted information. Specifically, game application 53 displays posted information in a position that is based on the display position of the virtual character indicated by the character identification information (e.g., in the vicinity of the character). Also, when character moves, the posted information is moved and displayed accordingly.

2-4. Exemplary Operations

Hereinafter, operations of posted information sharing system 1 will be described using a more specific example. User A is playing game application 53 on information-processing device 10A. In this example, game application 53 is a role playing game, and a character that is operated by user A (hereinafter, "player character A") moves over a map, and battles with monsters that are encountered on the map. When player character A defeats a specific monster MS (e.g., so-called boss character), the user is able to post a comment to post server 20. That is, in this example, the comment posting condition is the event of having defeated monster MS. User A posts the comment "This boss is strong", for example. The identification information of monster MS is added to this posted information.

User B is playing game application 53 on information-processing device 10B. Game application 53 is the same game as the game that is being played by user A described previously. User B downloads the extended posted information posted by user A beforehand (i.e., before playing the game, such as at the time of activating game application 53 or selecting a stage). When the character (hereinafter "player character B") operated by user B encounters monster MS on the map, game application 53 reads out posted information associated with character identification information indicating monster MS from memory 102. In this example, the comment "This boss is strong" posted by user A is read out.

Game application 53 displays the comment that is read out on the screen. At this time, the comment is displayed in the vicinity of the display position of monster MS on the screen. Also, this comment moves in accordance with the movement of monster MS.

Figure 7A:
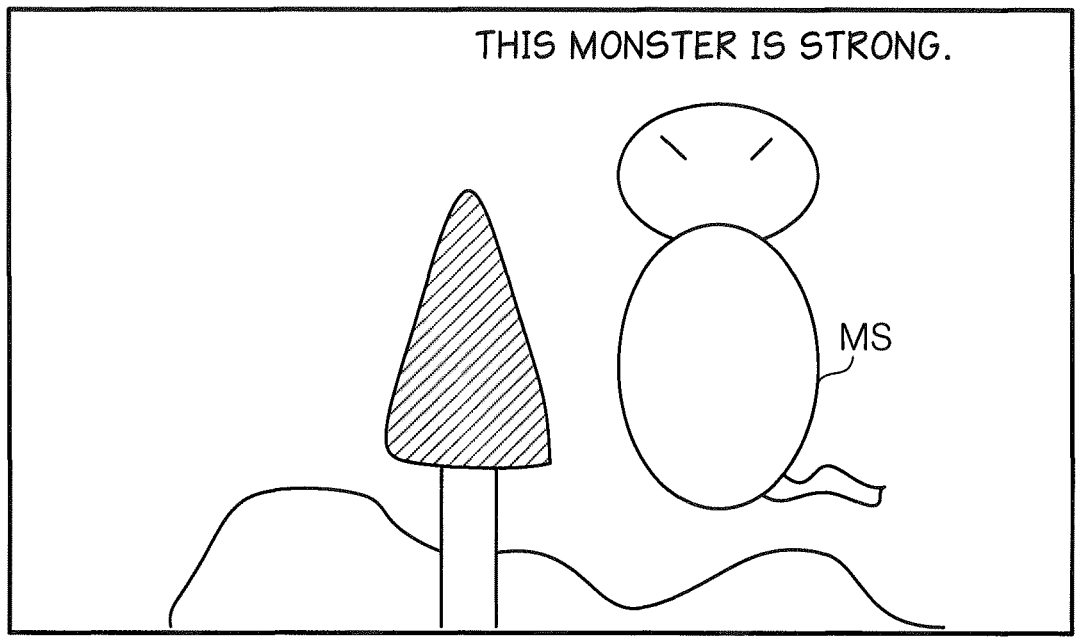
FIGS. 7A and 7B illustrate display of a post.
Figure 7B:
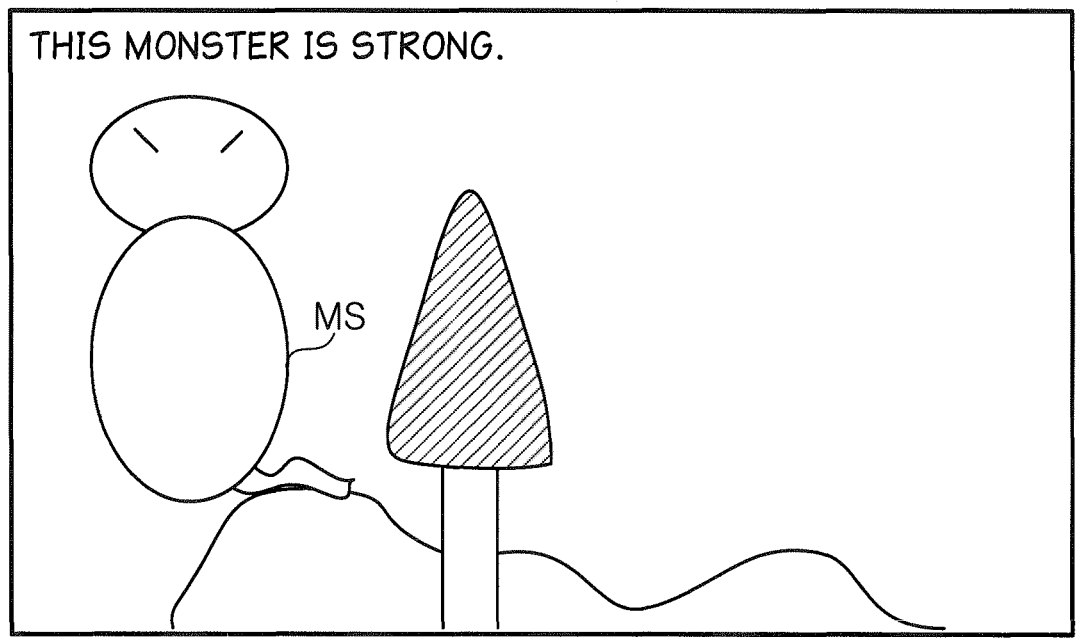

FIGS. 7A and 7B illustrate display of a comment. FIG. 7A shows a state before monster MS moves, and FIG. 7B shows a state after monster MS moves. The comment is shown to move in accordance with the movement of monster MS.

An example in which game application 53 is an action game divided into stages will be described as another example. In this game, the user is able to progress to the next stage when a given stage is cleared. When player character A defeats a specific enemy character E in stage X, the user is able to post a comment to the posting server. That is, in this example, the comment posting condition is that enemy character E is defeated, and enemy character E is set for the character identification information. Also, stage X is set for the stage identification information. User A posts the comment "This enemy is strong", for example.

When a stage selection image for selecting one of stages X, Y and Z from plural stages is displayed to prompt user B to make a selection, game application 53 selectably displays an icon indicating stage X, an icon indicating stage Y, and an icon indicating stage Z. At this time, game application 53 reads out, from memory 102, posted information including stage identification information indicating stage X, posted information including stage identification information indicating stage Y, and posted information including stage identification information indicating stage Z. In this example, the comment "This enemy is strong" posted by user A is read out. Game application 53 displays the comment that is read out in the vicinity of the icon indicating stage X. Posted information including stage identification information indicating stage Y, and posted information including stage identification information indicating stage Z are similarly displayed.

3. Modifications

The technology is not restricted to the embodiment described above. Various modifications can be applied to the exemplary embodiment. Some modifications will be described below. Two or more modifications from among the following modifications may be combined.

Although an example in which the application that generates extended posted information and the application that utilizes extended posted information are the same was described in the embodiment, the applications may differ. For example, in information-processing device 10B, an application that is compatible with the application that generated the extended posted information may perform processing using the extended posted information.

In the embodiment, the virtual character related to the comment posting condition was set as character identification information. However, the identification information of a character that differs from the virtual character related to the comment posting condition may be set.

As for the posted information displayed on information-processing device 10B, a user ID of the user who posted the comment, a timestamp of the time at which the comment was posted, and information indicating the progress status or use status of the application may be displayed, instead of a comment (or in addition to a comment).

The application to which the instant invention is applied is not limited to game application 53. Processing in which an application for realizing a function other than a game, such as a text editing application, a learning application, other practical software or a client application, uses additional data may be performed.

The software configuration of information-processing device 10 is not limited to that described in the embodiment. Also, the hardware configuration of information-processing device 10 is not limited to that illustrated in FIG. 2. A device including any hardware configuration that is able to realize the functions illustrated in FIG. 1 may be used.

Application programs executed by information-processing device 10 are not limited to those provided by storage media. Application programs may be provided by download via a network such as the Internet. Also, the system software of information-processing device 10 may be provided by storage media or download.

The devices constituting posted information sharing system 1 and the division of functions between these devices are not limited to that illustrated in FIG. 1. For example, post server 20 or another server device may have some of the functions described in the embodiment as functions of information-processing device 10. The division of functions can be designed as appropriate through the general technical knowledge of those skilled in the art.

What is claimed is:

1. A game system including a plurality of terminal devices and a predetermined server, the plurality of terminal devices being respectively used by a plurality of users, the game system comprising a processor system including at least one processor, the processor system being configured to:

perform interaction processing with at least one of a plurality of virtual game characters that exist in a predetermined virtual game space, based on an instruction input from the user of each terminal device;

generate posted information in connection with one virtual game character selected from the plurality of virtual game characters, based on an input of the user of each terminal device;

store the generated posted information in the server in association with identification information of the one virtual game character;

draw a virtual space image which is an image representing a virtual game space including a first virtual game character, select one item of posted information for the first game character, from among a plurality of items of posted information stored in the server, the plurality of items of posted information being generated based on inputs by the plurality of users, and the selected item of posted information being associated with identification information of the first virtual game character;

composite the selected item of posted information in the virtual space image in association with the virtual game character that is indicated by the identification information associated with the selected posted information, a display position of the selected item of posted information being determined based on a display position of the first virtual game character;

present the composite image to the user in each terminal device, and control movement of the virtual game character in the virtual game space, wherein the display position of the posted information is changed according to the controlled movement of the virtual game character.

2. The game system according to claim 1, wherein
the identification information of one of the plurality of virtual game characters is stored in association with the generated posted information.

3. The game system according to claim 1, wherein
posted information is generated using an input of a user, when predetermined interaction processing is performed, or when a result of the interaction processing satisfies a predetermined condition, and
the identification information of the one virtual game character, relating to the interaction processing performed at a time when the posted information is input, is added to the posted information, as the identification information of the one virtual game character.

4. The game system according to claim 3, wherein
the interaction processing is fight processing with the one virtual game character,
posted information is generated using an input of a user, when a result of the performed fight processing with the one virtual game character is a victory, and
the identification information of the one virtual game character, which resulted in victory at a time when the posted information is input, is added to the posted information, as the identification information of the one virtual game character.

5. The game system according to claim 3, wherein
the interaction processing is fight processing with the one virtual game character,
posted information is generated using an input of a user, when a result of the performed fight processing with the one virtual game character is a defeat, and
the identification information of the one virtual game character, which resulted in defeat at a time when the posted information is input, is added to the posted information, as the identification information of the one virtual game character.

6. The game system according to claim 1, wherein
the interaction processing with the one virtual game character is performed in each of the terminal devices, and is executed stand-alone.

7. The game system according to claim 1, wherein
the interaction processing with the one virtual game character is performed in each of the terminal devices, the interaction processing with the one virtual game character is performed in a first terminal device of the terminal devices, based on an operation input from a first user who uses the first terminal device, and the interaction processing with the one virtual game character is performed on a second terminal device of the terminal devices, based on an operation input from a second user who uses the second terminal device, and the interaction processing with the one virtual game character performed on the first terminal device is not based on an operation input from the second user who uses the second terminal device, and the interaction processing with the one virtual game character performed on the second terminal device is not based on an operation input from the first user who uses the first terminal device.

8. A game system comprising a processor system including at least one processor, the processor system being configured to;
perform interaction processing with at least one of a plurality of virtual game characters that exist in a predetermined virtual game space, based on an operation input from a user;
generate posted information in connection with one virtual game character selected from the plurality of virtual game characters using an input of the user;
accumulate and store the generated posted information, in association with identification information of the one virtual game character; and
perform processing for drawing a virtual space image which is an image representing a virtual game space including a first virtual game character, processing for selecting one item of posted information for the first game character, from among a plurality of items of posted information stored in the server, the plurality of items of posted information being generated based on inputs by the plurality of users, and the selected item of posted information being associated with identification information of the first virtual game character, processing for compositing the virtual space image and the selected item of posted information, in association with the virtual game character that is indicated by the identification information associated with the selected posted information, a display position of the selected item of posted information being determined based on a display position of the first virtual game character, and presenting the composite image to the user, and processing for controlling movement of the virtual game character in the virtual game space, wherein the display position of the posted information is changed according to the controlled movement of the virtual game character.

9. A control method that is executed by a computer in a game system including a plurality of terminal devices and a predetermined server, the plurality of terminal devices being respectively used by a plurality of users, the method comprising:
performing interaction processing with at least one of a plurality of virtual game characters that exist in a predetermined virtual game space, based on an operation input from the user of each terminal device;
generating posted information in connection with one virtual game character selected from the plurality of virtual game characters, based on an input of the user of each terminal device;
storing the generated posted information in the server in association with identification information of the one virtual game character; and
performing processing for drawing a virtual space image which is an image representing a virtual game space including a first virtual game character, processing for selecting one item of posted information for the first game character, from among a plurality of items of posted information stored in the server, the plurality of items of posted information being generated based on inputs by the plurality of users, and the selected item of posted information being associated with identification information of the first virtual game character, processing for compositing the selected item of posted information, in the virtual space image in association with the virtual game character that is indicated by the identification information associated with the selected posted information, a display position of the selected item of posted information being determined based on a display position of the first virtual game character, and presenting the composite image to the user in each terminal device, and processing for controlling movement of the virtual game character in the virtual game space, wherein the display position of the posted information is changed according to the controlled movement of the virtual game character.

10. A computer-readable non-transitory storage medium storing a program causing a computer device in a game system including a plurality of terminal devices and a predetermined server, the plurality of terminal devices being respectively used by a plurality of users, to execute a process, the process comprising:

performing interaction processing with at least one of a plurality of virtual game characters that exist in a predetermined virtual game space, based on an operation input from the user of each terminal device;

generating posted information in connection with one virtual game character selected from the plurality of virtual game characters, based on an input of the user of each terminal device;

transmitting the generated posted information to the server in association with identification information of the one virtual game character;

obtaining, from the server, the posted information with which the identification information is associated; and performing processing for drawing a virtual space image which is an image representing a virtual game space including a first virtual game character, processing for selecting one item of posted information for the first game character, from among a plurality of items of posted information stored in the server, the plurality of items of posted information being generated based on inputs by the plurality of users, and the selected item of posted information being associated with identification information of the first virtual game character, processing for compositing the selected item of posted information, in the virtual space image in association with the virtual game character that is indicated by the identification information associated with the selected posted information, and presenting the composite image to the user in each terminal device, and processing for controlling movement of the virtual game character in the virtual game space, wherein the display position of the posted information is changed according to the controlled movement of the virtual game character.

11. A terminal device in a game system including a plurality of terminal devices and a predetermined server, the plurality of terminal devices being respectively used by a plurality of users, the terminal device comprising a processor system including at least one processor, the processor system being configured to:

perform interaction processing with at least one of a plurality of virtual game characters that exist in a predetermined virtual game space, based on an operation input from the user of each terminal device;

generate posted information in connection with one virtual game character selected from the plurality of virtual game characters based on an input of the user of each terminal device;

transmit the generated posted information to the server in association with identification information of the one virtual game character;

obtain, from the server, the posted information with which the identification information is associated; and perform processing for drawing a virtual space image which is an image representing a virtual space including a first virtual game character, processing for selecting one item of posted information for the first game character, from among a plurality of items of posted information stored in the server, the plurality of items of posted information being generated based on inputs by the plurality of users, and the selected item of posted information being associated with identification information of the first virtual game character, processing for compositing the selected item of posted information, in the virtual space image in association with the virtual game character that is indicated by the identification information associated with the selected posted information, a display position of the selected item of posted information being determined based on a display position of the first virtual game character, and presenting the composite image to the user in each terminal device, and processing for controlling movement of the virtual game character in the virtual game space, wherein the display position of the posted information is changed according to the controlled movement of the virtual game character.

* * * * *